United States Patent
Maes et al.

(10) Patent No.: US 11,979,191 B2
(45) Date of Patent: May 7, 2024

(54) METHOD AND APPARATUS FOR ONU GROUPING

(71) Applicant: Nokia Solutions and Networks Oy, Espoo (FI)

(72) Inventors: Jochen Maes, Antwerp (BE); Yannick Lefevre, Heverlee (BE)

(73) Assignee: Nokia Solutions and Networks Oy, Espoo (FI)

( * ) Notice: Subject to any disclaimer, the term of this patent is extended or adjusted under 35 U.S.C. 154(b) by 218 days.

(21) Appl. No.: 17/701,046

(22) Filed: Mar. 22, 2022

(65) Prior Publication Data

US 2023/0010009 A1    Jan. 12, 2023

(30) Foreign Application Priority Data

Jul. 7, 2021 (EP) .................................... 21184263

(51) Int. Cl.
| | |
|---|---|
| *H04B 10/272* | (2013.01) |
| *H04J 14/02* | (2006.01) |
| *H04L 5/00* | (2006.01) |
| *H04Q 11/00* | (2006.01) |

(52) U.S. Cl.
CPC ........ *H04B 10/272* (2013.01); *H04J 14/0282* (2013.01); *H04L 5/0044* (2013.01); *H04Q 11/0067* (2013.01)

(58) Field of Classification Search
None
See application file for complete search history.

(56) References Cited

U.S. PATENT DOCUMENTS

| | | | |
|---|---|---|---|
| 8,483,563 B2 * | 7/2013 | Luo ..................... | H04J 3/0608 |
| | | | 398/58 |
| 8,724,994 B2 * | 5/2014 | Luo ..................... | H04B 10/27 |
| | | | 398/58 |
| 2018/0077475 A1 * | 3/2018 | Ye ..................... | H04B 10/272 |

(Continued)

OTHER PUBLICATIONS

Nokia, "G.hsp.comTC: Working test for ONU grouping", Jul. 31, 2020, International Telecommunications Union, SG15, 22 pages ( Year: 2020).*

(Continued)

*Primary Examiner* — David W Lambert
(74) *Attorney, Agent, or Firm* — Harness, Dickey & Pierce, P.L.C.

(57) ABSTRACT

An apparatus grouping data units for optical network units into groups of Encapsulation Method, EM, frame(s), wherein a respective group of EM frame(s) include data units addressed to a respective subset of ONUs, generating, based on the groups of EM frame(s), a Framing Sublayer payload including at least one specific frame, wherein, the specific frame includes a length indicator determined in relation to the length of the group(s) of EM frame(s) that is(are) directly following the specific frame and is(are) addressed to at least one subset of ONUs; instructing the ONUs assigned to at least one of said at least one subset to process the EM frame directly following the specific frame, and instructing the ONUs not assigned to the at least one subset to process the EM frame that is indicated by the length indicator of the specific frame; and transmitting the Framing Sublayer payload to the ONUs.

15 Claims, 6 Drawing Sheets

(56) References Cited

U.S. PATENT DOCUMENTS

2019/0313169 A1* 10/2019 Geng .................. H04Q 11/00
2020/0204257 A1* 6/2020 Krampl ................ H04B 10/25

OTHER PUBLICATIONS

Werner Van Hoof Nokia Corporate Belgium: "G.hsp.comTC: Working text for ONU grouping", ITU-T Draft; Study Period 2017-2020; Study Group 15, International Telecounication Union, Geneva ; CH vol. 2/15, Jul. 31, 2020 (Jul. 31, 2020), pp. 1-22.

Werner Van Hoof Nokia Belgium: G.hsp: Reducing ONU complexity through FEC codeword interleaving;C1914, Itu-T Draft; Study Period 2017-2020; Study Group 15; Series C1914, International Telecommunication Union, Geneva ; CH vol. 2/15, Jan. 14, 2020 (Jan. 14, 2020), pp. 1-6.

European Search Report for European Application No. 21/184,263 dated Dec. 17, 2021.

* cited by examiner

METHOD AND APPARATUS FOR ONU GROUPING

CROSS-REFERENCE TO RELATED APPLICATIONS

This application claims priority to and the benefit of European Patent Application No. 21184263.8 filed on Jul. 7, 2021, the entire contents of which are incorporated herein by reference.

FIELD OF THE INVENTION

Various example embodiments relate to optical networks, specifically to downstream communication.

BACKGROUND

European patent application with the Application number EP20151843.8 is incorporated herein by reference.

EP20151843.8 has proposed a method of Optical Network Unit (ONU) grouping and allows an ONU in an ONU group to identify in a data stream the data that is intended for the ONUs in that group.

In EP20151843.8, it is necessary to have all ONUs attached to the Optical Line Terminal, OLT, support ONU grouping.

However, in one example scenario, not all the ONUs in the network support ONU grouping.

According to EP20151843.8, ONU grouping is not possible if not all the ONUs in the network support ONU grouping.

SUMMARY OF THE INVENTION

Amongst others, it is an object of embodiments of the present disclosure to enable ONU grouping while maintaining support for ONUs that do not have ONU grouping capabilities.

This object is achieved, according to a first example aspect of the present disclosure, by an apparatus, for use by an Optical Line Terminal, OLT, communicatively connected to optical network units, ONUs, comprising means for performing: grouping data units for the optical network units into groups of Encapsulation Method, EM, frame(s), wherein a respective group of EM frame(s) comprises data units addressed to a respective subset of ONUs, generating, based on the groups of EM frame(s), a Framing Sublayer payload comprising at least one specific frame, wherein, the specific frame comprises a length indicator determined in relation to the length of the group(s) of EM frame(s) that is(are) directly following the specific frame and is(are) addressed to at least one subset of ONUs; instructing the ONUs assigned to at least one of said at least one subset to process the EM frame directly following the specific frame, and instructing the ONUs not assigned to the at least one subset to process the EM frame that is indicated by the length indicator of the specific frame; transmitting the Framing Sublayer payload to the ONUs.

In one embodiment, the specific frame is a special EM frame comprising an EM header and zero payload.

In one embodiment, the length indicator is comprised in a Payload Length Indicator field of the EM header of the special EM frame.

In one embodiment, the specific frame further comprises respondent information for instructing the ONUs assigned to at least one of said at least one subset to process the EM frame directly following the specific frame, and/or the ONUs not assigned to the at least one subset to process the EM frame that is indicated by the length indicator of the specific frame.

In one embodiment, the respondent information is comprised in a port-ID field or in an options field of the EM header of the special EM frame.

In one embodiment, the specific frame comprises a subset indicator indicating a subset, and the length indicator is determined in relation to the length of the group of EM frame(s) that is directly following the specific frame and is addressed to the subset of ONUs indicated in the subset indicator, or in relation to the length of the group(s) of EM frame(s) that is(are) directly following the specific frame and is(are) not addressed to the subset of ONUs indicated in the subset indicator.

In one embodiment, the specific frame comprises at least one of: an ONU indicator with an invalid value, an unassigned ONU indicator or an ONU indicator indicating an ONU that is different from the ONUs assigned to the subset addressed by the group of EM frame(s) preceding the specific frame, and wherein the length indicator is determined in relation to the length of the group(s) of EM frame(s) directly following the specific frame that is(are) not addressed to the subset of ONUs addressed by the group of EM frame(s) preceding the specific frame.

In one embodiment, the means are further configured for: communicating, to the respective ONUs, an indication of a beginning location of the group of EM frame(s) corresponding to the subset to which it is assigned.

In one embodiment, at least one group of EM frame(s) is transmitted using a pre-determined modulation format and/or encoded with a pre-determined FEC code and at least one other group of EM frame(s) is transmitted using a different modulation format and/or encoded with a different FEC code.

In one embodiment, the means are further configured for: communicating, to the respective ONUs, a subset identification of the subset to which it is assigned.

According to a second aspect of the present disclosure, there is provided an apparatus, for use by an Optical Network Unit, ONU, communicatively connected to an Optical Line Terminal, OLT, comprising means for performing: receiving a Framing Sublayer payload from the OLT; obtaining a specific frame comprised in the Framing Sublayer payload, wherein, the specific frame comprises a length indicator related to the length of group(s) of EM frame(s) directly following the specific frame that is(are) addressed to at least one subset of ONUs; determining, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

In one embodiment, the means are further configured for: determining the next EM frame to be processed based on a special configuration regarding ONU grouping, wherein the special configuration regarding ONU grouping comprises at least one of: a subset Identification of the subset to which the respective ONU is assigned or an indication of a beginning location of the group of EM frame(s) corresponding to the subset to which it is assigned.

In one embodiment, the means are further configured for: receiving the special configuration regarding ONU grouping from the OLT.

According to a third aspect of the present disclosure, there is provided a method comprising a method, for use by an Optical Line Terminal, OLT, communicatively connected to optical network units, ONUs, comprising: grouping data units for the optical network units into groups of Encapsulation Method, EM, frame(s), wherein a respective group of EM frame(s) comprises data units addressed to a respective subset of ONUs, generating, based on the groups of EM frame(s), a Framing Sublayer payload comprising at least one specific frame, wherein, the specific frame comprises a length indicator determined in relation to the length of the group(s) of EM frame(s) that is(are) directly following the specific frame and is(are) addressed to at least one subset of ONUs; instructing the ONUs assigned to at least one of said at least one subset to process the EM frame directly following the specific frame, and instructing the ONUs not assigned to the at least one subset to process the EM frame that is indicated by the length indicator of the specific frame; transmitting the Framing Sublayer payload to the ONUs.

According to a fourth aspect of the present disclosure, there is provided a method, for use by an Optical Network Unit, ONU, communicatively connected to an Optical Line Terminal, OLT, comprising: receiving a Framing Sublayer payload from the OLT; obtaining a specific frame comprised in the Framing Sublayer payload, wherein, the specific frame comprises a length indicator related to the length of group(s) of EM frame(s) directly following the specific frame that is(are) addressed to at least one subset of ONUs; determining, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

The various example embodiments of the first example aspect may be applied as example embodiments to the other example aspects.

According to the various embodiments, ONU grouping can be realized in the presence of ONUs that have no explicit support for ONU grouping. Furthermore, ONU grouping can be realized with higher flexibility.

Moreover, it is possible to enable ONU grouping without strict delineation between codewords and EM frames. It allows to remove the coupling between the service adaption sublayer and the Physical adaptation sublayer.

BRIEF DESCRIPTION OF THE FIGURES

For a more complete understanding of example embodiments of the present invention, reference is now made to the following descriptions taken in connection with the accompanying drawings in which.

DETAILED DESCRIPTION

Figure 1:
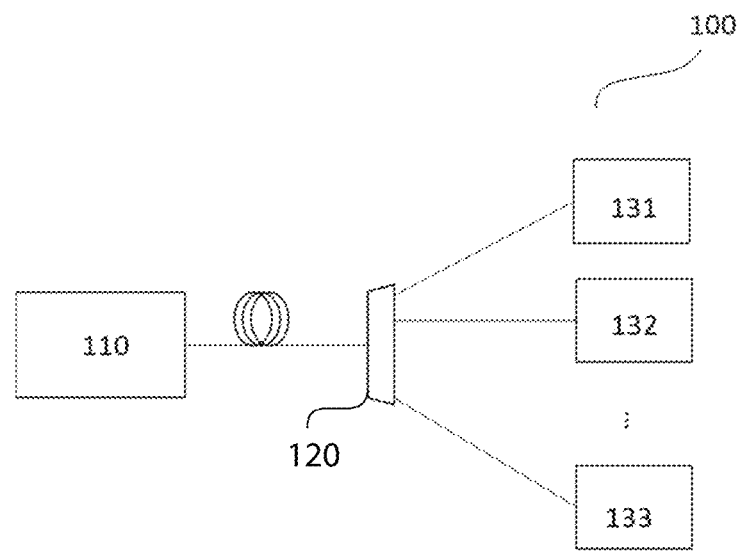
FIG. 1 shows a part of an exemplifying communication network in which examples of disclosed embodiments may be applied.

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. The sequence of method steps is not limited to the specific embodiments, the method steps may be performed in other possible sequence. Similarly, specific structural and functional details disclosed herein are merely representative for purposes of describing the embodiments. The invention described herein, however, may be embodied in many alternate forms and should not be construed as limited to only the embodiments set forth herein.

FIG. 1 shows a part of an exemplifying communication network in which examples of disclosed embodiments may be applied.

As shown in FIG. 1 in a passive optical network, PON, 100, an OLT 110 at the network side is used to connect to a plurality of ONUs 131, 132, . . . , 133 at the user side by means of an optical distribution network (ODN) or fiber plant 120 that contains optical fibers and splitters, but no active components. A skilled person shall understand the number of ONUs is not limited to the given example. The OLT 110 may be connected to for example up to 64 ONUs.

Most PON technologies such as G-PON, E-PON, and XG(S)-PON are time-division multiplexing (TDM) PON technologies, in which the fiber medium is shared in time between the different ONUs. In addition, time- and wavelength-division multiplexing (TWDM) PON technologies exist, such as next-generation NG-PON2, in which multiple TDM systems at different wavelength are stacked on the same PON system. Example embodiments apply to both TDM and TWDM PON systems.

EP20151843.8 has proposed a method of ONU grouping and allows an ONU in an ONU group to identify in a data stream the data that is intended for the ONUs in that group.

Figure 2:
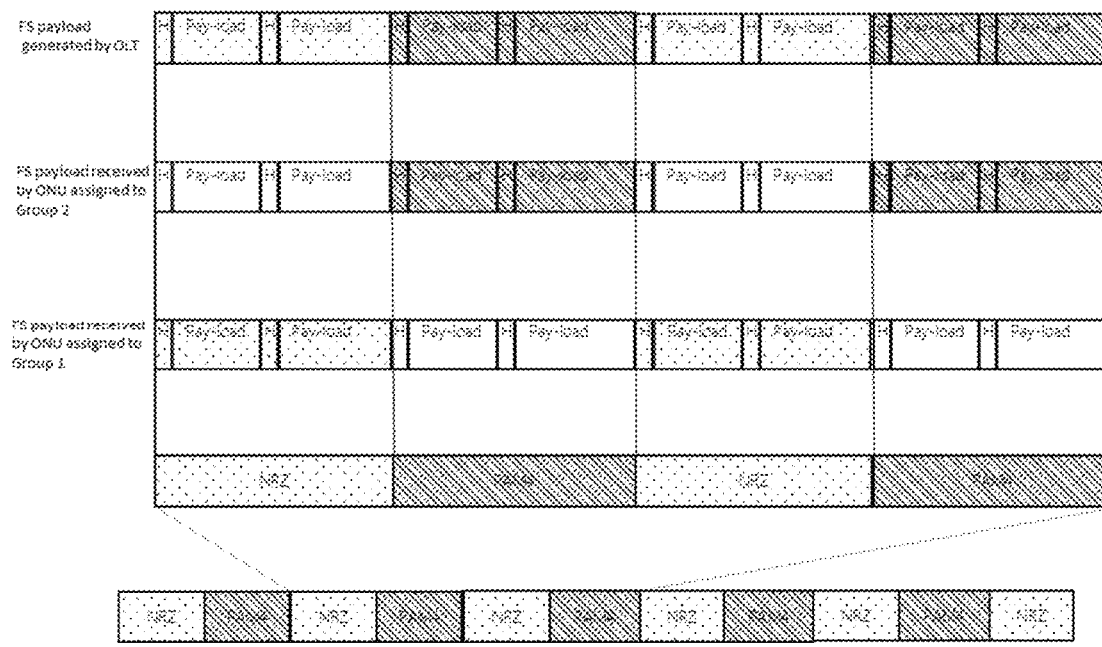
FIG. 2 shows an example construction of a frame according to EP20151843.8.

FIG. 2 shows an example construction of a frame according to EP20151843.8.

In the example shown in FIG. 2, the ONUs are grouped into two subsets. For example, ONUs 131 and 132 may be allocated to Group 1 and the ONU 133 to Group 2.

The data units addressed to the ONUs assigned to Group 1 are grouped together, forming a group of EM frames, and marked with dotted pattern. The data units addressed to the ONUs assigned to Group 2 are grouped together forming a group of EM frames marked with diagonal stripes. Although not shown in the figure, the data units may be of various sizes. The last data unit of each group may be fragmented.

Then as part of Framing Sublayer, FS, payload, the EM frames addressed to Group 1 are encoded and modulated into a set of Non-Return Zero (NRZ) codewords, also marked with dotted pattern, and the EM frames addressed to Group 2 are encoded and modulated into a set of 4 level Pulse Amplitude Modulation (PAM4) codewords, also marked with diagonal stripes.

In the example shown in FIG. 2, the ONUs assigned to Group 1 obtains FS payload as shown in the third row of FIG. 2. In the FS payload, the FS payload corresponding to the set of NRZ codewords is demodulated and decoded, and marked with dotted pattern. Since ONUs assigned to Group 1 do not need to decode the PAM4 codewords. PAM4 codewords may be non-decoded or wrongly decoded in the obtained FS payload. The PAM4 codewords are not relevant to ONUs assigned to Group 1, and the corresponding FS payload is thus marked blank in the third row of FIG. 2.

Similarly, the ONUs assigned to Group 2, for example ONU 133, obtains FS payload as shown in the second row of FIG. 2. In the FS payload, the FS payload corresponding to the set of PAM4 codewords is decoded, and marked with diagonal stripes. Since ONUs assigned to Group 2 do not need to decode the NRZ codewords. NRZ codewords may be non-decoded or wrongly decoded in the obtained FS payload.

The NRZ codewords are not relevant to ONUs assigned to Group 2, and the corresponding FS payload is thus marked blank in the second row of FIG. 2.

As shown in FIG. 2, there is strict delineation between EM framing and encoding. The alignment between the EM framing and encoding causes a dependency or relation that complicates the processing.

Furthermore, according to EP20151843.8, all ONUs attached to the OLT need to support ONU grouping. For example, each ONU needs to have knowledge of subset information, such as the allocation pattern, so as to be able to locate the data units intended for the subset to which it is assigned.

However, in one example scenario, not all the ONUs in the network support ONU grouping. There is thus a need for an improved apparatus and method to enable ONU grouping in a way that is compatible with ONUs that do not support ONU grouping.

Figure 3:
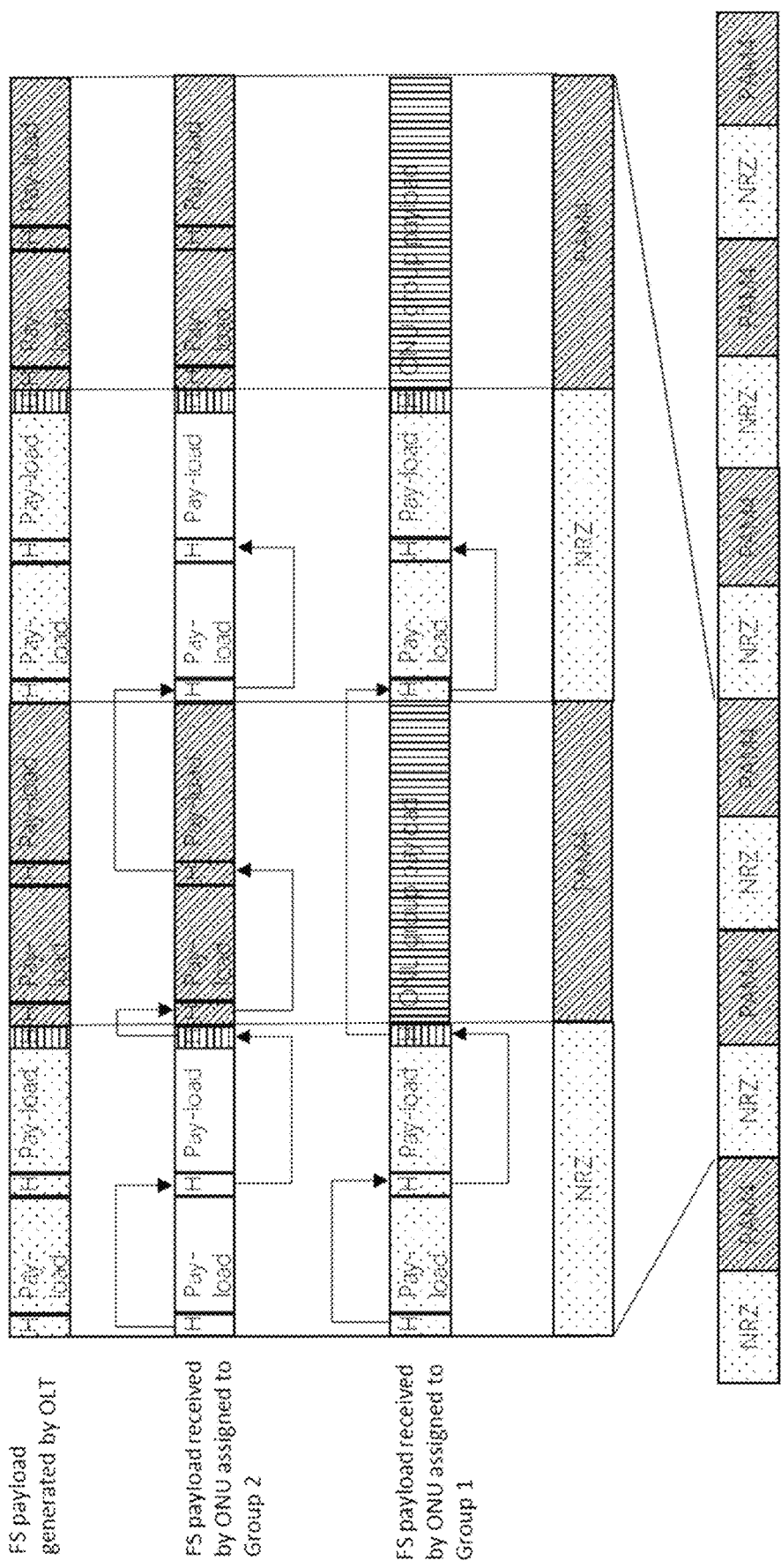
FIG. 3 shows an example construction of a frame according to an example embodiment.

FIG. 3 shows an example construction of a frame according to an example embodiment.

In the example shown in FIG. 3, the ONUs are also grouped into two subsets. For example, Group 1 may comprise ONUs compliant to the first version of G.hsp-.comTC (ITU-T G.9804.2), namely they may have no knowledge of the special configuration regarding ONU grouping. Group 2 may comprise ONUs having knowledge of the special configuration regarding ONU grouping. The special configuration regarding ONU grouping may comprise at least one of: a subset Identification of the subset to which the respective ONU is assigned or the beginning location of the group of EM frame(s) corresponding to the subset to which it is assigned, which will be explained below with respect to FIG. 6. The special configuration regarding ONU grouping may be transmitted from OLT to the ONUs or manually configured in the ONU.

An OLT, for example the OLT 110 of FIG. 1, implementing the apparatus in which examples of the disclosed embodiments may be applied, groups data units for the ONUs into groups of EM frame(s), wherein each group of EM frame(s) comprises data units addressed to a respective subset of ONUs. Similar as the example in FIG. 2, the data units addressed to the ONUs assigned to Group 1 are grouped together forming a group of EM frames marked with dotted pattern. The data units addressed to the ONUs assigned to Group 2 are grouped together forming a group of EM frames marked with diagonal stripes. Likewise, the data units may be of various sizes. The last data unit of each group may be fragmented.

The OLT 110 then generates a FS payload based on the groups of EM frame(s). Specifically, in the embodiment shown in FIG. 3, there is a specific frame marked with horizontal stripes comprised in the FS payload, preceding the data units intended for the ONUs assigned to Group 2. The specific frame comprises a length indicator determined in relation to the length of the group of EM frames that is directly following the specific frame and is intended for ONUs assigned to Group 2.

In one embodiment, the specific frame is a special EM frame comprising an EM header and zero payload. In G.hsp.comTC, the EM headers act as a linked list: each EM header indicates its payload length (PLI), which an ONU can use to locate the next header in the bitstream. This allows an ONU to easily locate EM headers in the frame one after the other, and retrieve the payload data from the EM packets with a matching port-ID.

In one embodiment, the length indicator is comprised in a Payload Length Indicator, PLI, field of the EM header of the special EM frame.

In other examples, it is also possible to use a different structure (for instance a new message structure) for the specific frame, while still having the same functionality.

In one embodiment, the specific frame further comprises respondent information for instructing the ONUs assigned to at least one of the subset(s) addressed by the group(s) of EM frame(s), the length of which is indicated in the length indicator of the specific frame, to process the EM frame directly following the specific frame, and the ONUs not assigned to said subset(s) to process the EM frame that is indicated by the length indicator of the specific frame. A skilled person shall understand that "to process the EM frame" not necessarily implies processing the full EM frame, but may be restricted to processing the header in the EM frame only, for example depending on the ONU ID in that header.

In one embodiment, the respondent information is comprised in a port-ID field or in an options field of the EM header of the special EM frame.

Specifically, in the embodiment shown in FIG. 3, a subset indicator may be comprised in a port-ID field of the EM header of the special EM frame. The subset indicator may indicate Group 2, namely the subset of ONUs addressed by the group of EM frame directly following the specific frame. The length indicator comprised in the specific frame indicates the length of the group of EM frames that is directly following the specific frame and is addressed to Group 2, namely the subset of ONUs indicated in the subset indicator.

Figure 4:
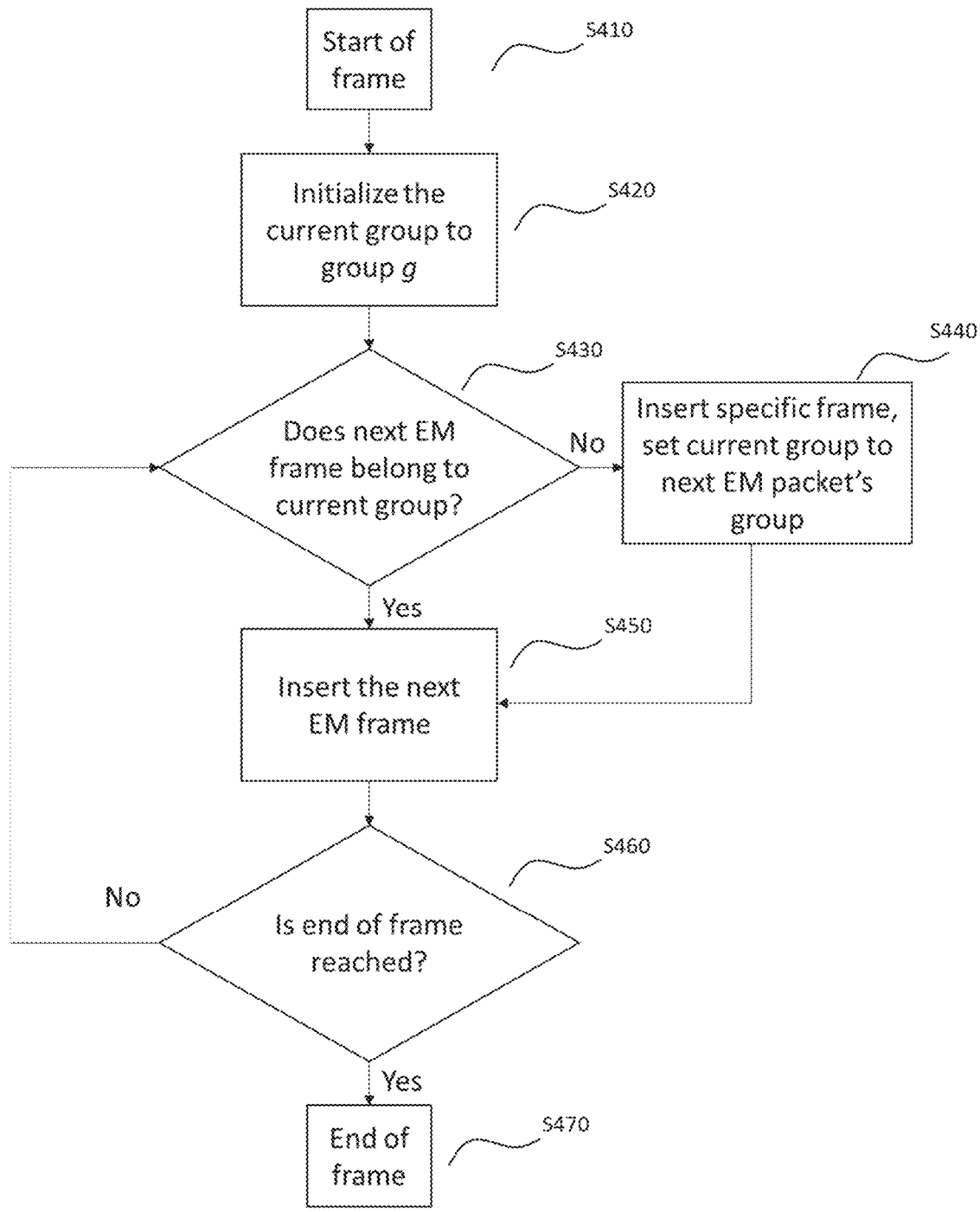
FIG. 4 shows example behaviour of an apparatus for use by an OLT according to an example embodiment.

FIG. 4 shows example behaviour of an apparatus for use by an OLT according to an example embodiment.

As shown in FIG. 4, the OLT 110 may start to construct a FS frame in step S410, then initialize the current group to a certain (fixed or variable) group g in step S420. The OLT 110 may determine in step S430 whether the current group of frames is complete. This determining may be based on a grouping of EM frames in a prior step. Further alternatively, this determining may be based on ingress or queue information for the current or other group of frames. Alternatively, this determining may be based on achieving a desired length for the group of frames. The last frame in the group may be fragmented.

If the OLT 110 determines that the current group of frames is not complete, it may insert the next EM frame in step S450.

Figure 6:
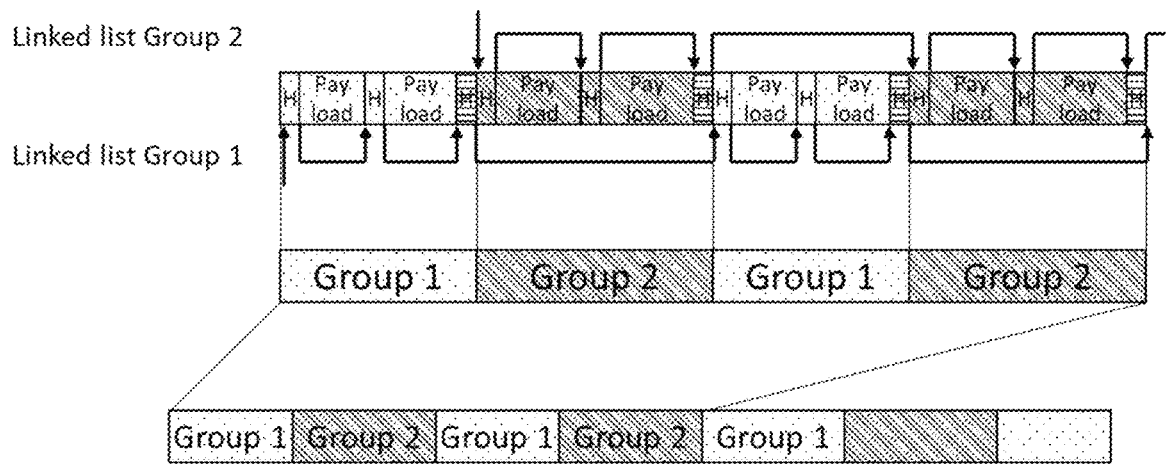
FIG. 6 shows an example construction of a frame according to another embodiment.

If the OLT 110 determines that the current group of frames is complete, it may insert the specific frame as described with respect to FIG. 3 and the following FIG. 6, and set current group to next EM packet's group in step S440. Then the OLT 110 may insert the next EM frame in step S450.

The OLT 110 may proceed with step S430 if it determines in step S460 that the end of FS frame is not reached. The FS frame ends in step S470, if the end of FS frame is reached.

After the FS payload is generated, the OLT 110 transmits the FS payload to the ONUs. The OLT may start transmission of the FS payload before the full FS frame is generated.

Specifically, still referring to FIG. 3, as part of FS payload, the EM frames intended for the ONUs assigned to Group 1, together with the specific frame preceding the EM frames intended for the ONUs assigned to Group 2, may then be encoded with a pre-determined FEC code and modulated into a set of NRZ codewords, also marked with dotted pattern. Part of the EM frames intended for the ONUs assigned to Group 2 may be encoded with a different FEC code and modulated using a different modulation format (e.g. PAM4) into a set of e.g. PAM4 codewords, also marked with diagonal stripes. In case the use of different FEC codes and/or different modulation formats results in different information rates, the length indicated by the length indicator may be adapted to compensate for the difference in information rate between the groups of EM frame(s) transmitted using different modulation formats and/or encoded with different FEC codes, for example, the EM frames intended for the ONUs assigned to Group 1 and Group 2.

In another example, it is also possible that all the EM frames are encoded and/or modulated in the same way.

A skilled person should understand that the codewords of both sets may be bit-interleaved before being transmitted to the ONUs.

Upon receiving the stream of codewords, an ONU assigned to Group 1, may demodulate the NRZ codewords and then decode the codewords according to the pre-determined FEC code, thereby obtaining FS payload as shown in the third row of FIG. 3. Since such an ONU for example ONU 131 may have no knowledge of the special configuration regarding ONU grouping, the codewords encoded using PAM4 will be decoded into erroneous payload, marked with vertical stripes. Meanwhile, since the specific frame preceding the EM frames intended for the ONUs assigned to Group 2 is encoded with the pre-determined FEC code, it can be correctly decoded.

The ONU 131 assigned to Group 1 may determine that the subset indicator in the specific frame does not match with its own ONU port ID, allowing it to jump over the erroneous payload based on the length indicator comprised in the specific frame, thereby locating the next regular EM header that is intended for Group 1, as shown by the linked arrows around the FS payload in the third row of FIG. 3.

Thus, various embodiments make it possible to enable ONU grouping in a way that is compatible with ONUs that do not have explicit support for ONU grouping, such as ONUs that are compliant to the first version of G.hsp.comTC.

In another example, the ONU 132 assigned to Group 1 may have the knowledge of the special configuration regarding ONU grouping, it may further determine that the subset indicator in the specific frame does not match with its subset ID, and then determine a next EM frame to be processed as the EM frame that is indicated by the length indicator of the specific frame.

Thereby, the length indicator in the specific frame allows the ONU, even the legacy G.hsp.comTC compliant ONU, to locate the next regular EM header that corresponds to its group, Group 1 in the embodiment shown in FIG. 3, even if that ONU cannot decode or otherwise interpret the payload in the segments of the other ONU groups, i.e., the intermittent EM packets assigned to the other groups.

Upon receiving the stream of codewords, an ONU assigned to Group 2, for example ONU 133, implementing the apparatus in which examples of the disclosed embodiments may be applied, having knowledge of the special configuration regarding ONU grouping may demodulate the PAM4 codewords and also the NRZ codewords and then decode the codewords according to the FEC codes used for encoding the respective codewords, thereby obtaining the FS payload as shown in the second row of FIG. 3.

Generally, after an ONU reads the specific frame comprised in the FS payload, it determines a next EM frame to be processed as the EM frame directly following the specific frame, if the ONU is assigned to the at least one subset addressed by the group(s) of EM frame(s), the length of which is indicated in the length indicator of the specific frame. Alternatively, it determines a next EM frame to be processed as the EM frame that is indicated by the length indicator of the specific frame, if the ONU is not assigned to the at least one subset.

Specifically, when the ONU 133 assigned to Group 2 determines that the subset indicator in the specific frame matched its own subset ID, it means that the frames directly following specific frame are intended for its subset. It may ignore the length indicator of the specific frame, and locate the next EM header directly following the specific frame.

In one embodiment, the OLT may communicate, to the respective ONUs, a subset identification of the subset to which it is assigned. For example, the assigning is done by associating a subset ID to the subset of ONU, and then the OLT communicates the subset ID to the ONUs assigned to that subset, for instance using a unicast physical layer operation administration and management, PLOAM, message.

Alternatively, the ONU grouping and the subset identification may also be fixed or manually configured.

Although in the example shown in FIG. 3, the ONUs are grouped into only two subsets, a skilled person shall understand that in other examples, the ONUs may be grouped into more than two subsets. In that case, the structure of the FS payload may be adapted accordingly. For simplicity, it will not be elaborated here. Optionally, any particular ONU may be assigned to more than one subset.

Figure 5:
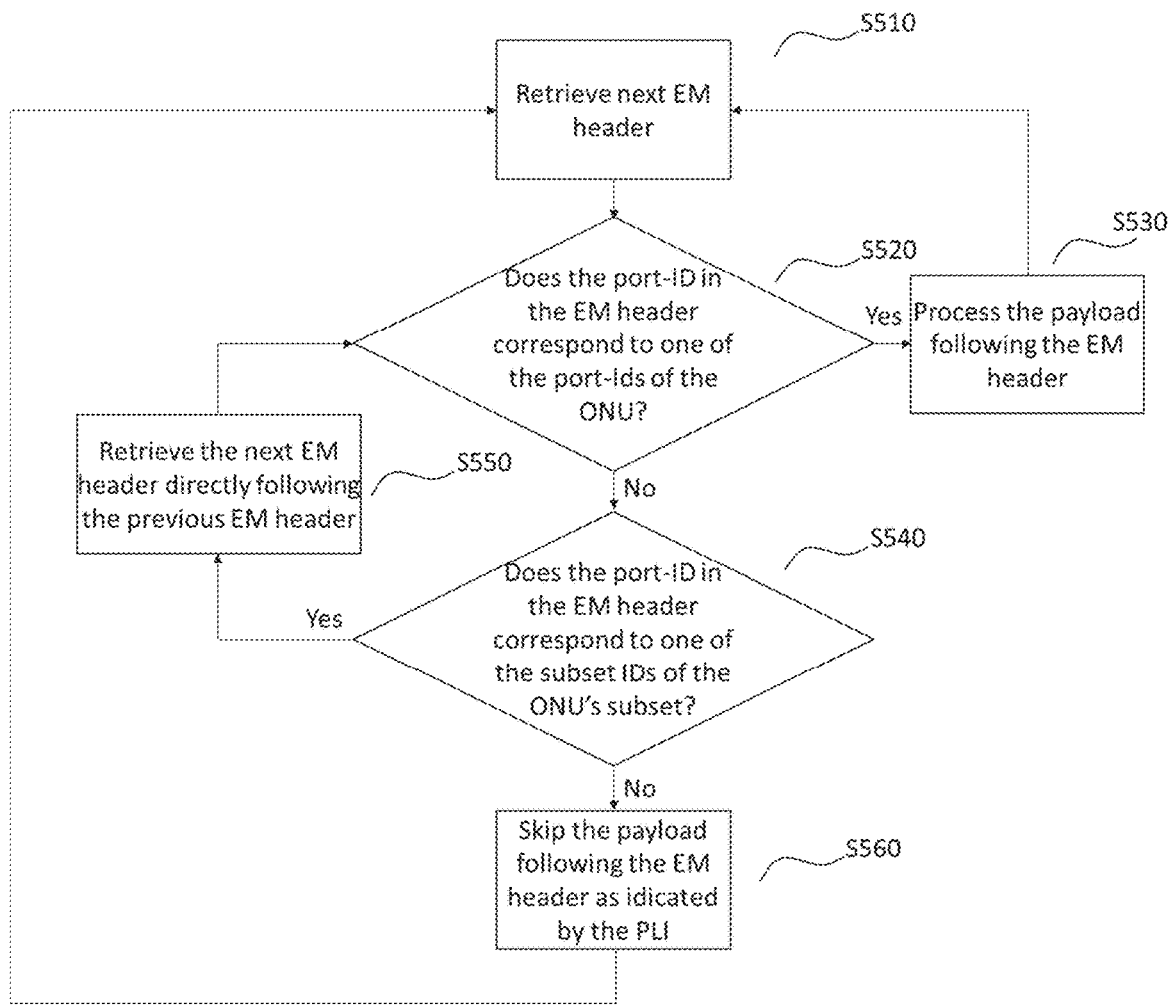
FIG. 5 shows example behaviour of an apparatus for use by an ONU according to an example embodiment.

FIG. 5 shows example behaviour of an apparatus for use by an ONU according to an example embodiment.

As shown in FIG. 5, an ONU may retrieve an EM header in step S510, and then determine in step S520 whether the port-ID in the EM header corresponds to one of the port-IDs of the ONU. If the ONU determines that the port-ID in the EM header matches one of its ONU port-IDs, it means this EM frame is intended for it. The ONU subsequently processes the payload following the EM header in step S530.

If the ONU determines that the port-ID in the EM header does not match one of its ONU port-IDs, it further determines further in step S540 whether the port-ID in the EM header correspond to one of the subset-IDs of the subset to which it is assigned.

If the port-ID in the EM header matches one of the subset-IDs of the subset to which it is assigned, it means that the current EM frame is a specific frame and the EM frames directly following specific frame are intended for its subset. The ONU may ignore the length indicator of the specific frame and retrieve the next EM header directly following the current EM header in step S550, and proceed further with step S520.

If the port-ID in the EM header does not match one of the subset-IDs of the subset to which it is assigned, the ONU may skip the payload following the EM header as indicated by the length indicator of the current EM header, and proceed further with step S520.

FIG. 6 shows an example construction of a frame according to another embodiment.

In the example shown in FIG. 6, the grouping of ONUs is similar as described with respect to FIG. 3, and will not be repeated here.

An OLT, for example the OLT 110 of FIG. 1, implementing the apparatus in which examples of the disclosed embodiments may be applied, groups data units for the ONUs into groups of EM frame(s), wherein each group of EM frame(s) comprises data units addressed to a respective subset of ONUs. Similar as the example in FIG. 3, the data units addressed to the ONUs assigned to Group 1 are grouped together forming a group of EM frames marked with dotted pattern. The data units addressed to the ONUs assigned to Group 2 are grouped together forming a group of EM frames marked with diagonal stripes.

The OLT 110 then generates a FS payload based on the groups of EM frame(s). Specifically, in the embodiment shown in FIG. 6, there is a first specific frame marked with horizontal stripes comprised in the FS payload, succeeding the data units intended for the ONUs assigned to Group 1 and preceding the data units intended for the ONUs assigned to Group 2. The first specific frame comprises a length indicator determined in relation to the length of the group of EM frames that is directly following the first specific frame and is intended for ONUs assigned to Group 2. There is a second specific frame, also marked with horizontal stripes, succeeding the data units intended for the ONUs assigned to Group 2 and preceding the data units intended for the ONUs assigned to Group 1. The second specific frame comprises a length indicator determined in relation to the length of the group of EM frames that is directly following the second specific frame and is intended for ONUs assigned to Group 1.

The first specific frame may comprise a subset indicator indicating Group 1, namely the subset of ONUs addressed by the group of EM frames preceding the specific frame. The second specific frame may comprise a subset indicator indicating Group 2.

Alternatively, any or all of the specific frames may comprise at least one of: an ONU indicator with an invalid value, an unassigned ONU indicator or an ONU indicator indicating an ONU that is different from the ONUs assigned to the subset addressed by the group of EM frame(s) preceding the specific frame. For example, any or all of the specific frames may comprise an invalid value in the port-ID field of the special EM header.

Generally, the respondent information, for example, selected from the subset indicator, the unassigned ONU indicator, the ONU indicator or the ONU indicator with an invalid value, may be used to instruct the ONUs not assigned to the subset addressed by the group of EM frame(s), the length of which is indicated in the length indicator, to process the EM frame that is indicated by the length indicator of the specific frame.

In another embodiment, the ONUs may be grouped into more than two groups. Then the length indicator may be determined in relation to the length of the groups of EM frames that are directly following the specific frame and are not addressed to the subset of ONUs addressed by the group of EM frame(s) preceding the specific frame. For example, the length indicator may indicate the combined length of more than one group.

After the FS payload is generated, the OLT 110 transmits the FS payload to the ONUs. A skilled person shall understand that the same encoding/decoding may be used for both ONU groups, or different modulation and/or FEC encoding may be used for the different groups as described with respect to FIG. 3. If the same modulation/FEC code is used, then the ONUs of both groups will obtain the same FS payload, as shown in FIG. 6. If different modulation/FEC code is used, then the payload of one group will be erroneous for the other group, as explained with respect to FIG. 3.

Upon obtaining FS payload as shown in the first row of FIG. 6, an ONU assigned to Group 1, for example the ONU 131, may locate a next EM header based on the PLI field of the current EM header, and determines to process the payload of the EM frame when the port-ID in the EM header matches its own ONU port ID. It may locate the EM headers following the linked arrows below the FS payload.

In one example, the ONU 131 assigned to Group 1 may have no knowledge of the special configuration regarding ONU grouping. When it reads the first specific frame, it determines that the subset indicator (alternatively, the unassigned ONU indicator, the ONU indicator or the invalid value) in the first specific frame does not match with its own ONU port ID, it will jump over the following EM frames based on the length indicator comprised in the first specific frame.

In another example, the ONU 132 assigned to Group 1 may have the knowledge of the special configuration regarding ONU grouping, it may further determine that the subset indicator in the specific frame matches with its subset ID, and then determine a next EM frame to be processed as the EM frame that is indicated by the length indicator of the specific frame. Having such knowledge may be advantageous e.g. for clock recovery, equalization tracking and/or incrementation of counters for forward error corrections.

In the example where the specific frame comprises a subset indicator indicating a subset, the next EM frame to be processed may be determined further based on a predetermined rule. The predetermined rule indicates the next EM frame to be processed when the ONU is assigned to the subset indicated in the subset indicator. For example, in the example shown in FIG. 3, the predetermined rule may indicate the ONU to process the EM frame directly following the specific frame as the next EM frame, if the subset indicator in the specific frame matches the subset ID of the subset to which the ONU is assigned. While in the example shown in FIG. 6, the predetermined rule may indicate the ONU to process the EM frame that is indicated by the length indicator of the specific frame as the next EM frame, if the subset indicator in the specific frame matches the subset ID of the subset to which the ONU is assigned. The predetermined rule may be manually configured or communicated from the OLT to the ONU.

In one embodiment, the OLT 110 may communicate, to the respective ONUs, an indication of beginning location of the group of EM frame(s) corresponding to the subset to which it is assigned. For example, the beginning location of the respective group may be included in the FS header. In another example, the beginning location of the respective group may be communicated via a control message such as a PLOAM message or an ONU management and control interface, OMCI, message. This information is subsequently used by the respective ONU to locate its relevant EM frames. In this way, the ONUs assigned to at least one of the subset(s) addressed by the group(s) of EM frame(s), the length of which is indicated in the length indicator of the specific frame, is instructed to process the EM frame directly following the specific frame.

Accordingly, the ONU 133 assigned to Group 2, implementing the apparatus in which examples of the disclosed embodiments may be applied, may start from the first EM header corresponding to Group 2, and follow the linked arrows above the FS payload shown in the first row of FIG. 6. When the ONU 133 assigned to Group 2 reads the second specific frame, it determines that the subset indicator in the second specific frame matches with its own subset ID, (alternatively, the unassigned ONU indicator, the ONU indicator or the invalid value comprised in the second specific frame does not match with its own ONU port ID), it means the following EM frames, the length of which is indicated in the length indicator of the specific frame, are not addressed to the subset to which it is assigned. In that case, it will jump over the following EM frames based on the length indicator comprised in the second specific frame.

In the example of FIG. 6, the ONU 131 assigned to Group 1 does not read the second specific frame, because the length indicator in the first specific frame leads the ONU 131 assigned to Group 1 to the next EM header intended for Group 1. Similarly, the ONU 133 assigned to Group 2 does not read the first specific frame, because the ONU 133 assigned to Group 2 starts after the first specific frame and the length indicator in the second specific frame leads the ONU 133 assigned to Group 2 directly to the next EM header intended for Group 2.

In another example, the specific frame may also not contain any respondent information but only the length indicator. In this case, any ONU that processes the specific frame, may always jump over the following EM frames based on the length indicator comprised in the specific frame. This is possible for the example of FIG. 6, as any specific frame is only processed by a subset of ONUs that should not process the following EM frames indicated by the length indicator.

In this way, each subset of ONU can have its separate linked list of EM headers. The length indicator in the specific frame points to the next EM header intended for the subset of ONUs addressed by the preceding EM frames, hence the length indicator can be the sum of the length of more than one ONU group segment.

The advantage of this embodiment is that all ONUs can process the specific frames in the same way, while in FIG. 3, the group 2 ONUs require different behaviours with respect to the specific frames compared to the group 1 ONUs. This embodiment is particularly useful if the different ONU groups use different FEC or modulation, since it avoids rapid context switching in the digital receiver chain.

Specifically, in the embodiment where any or all of the specific frames comprise no subset indicator or at least one of: an ONU indicator with an invalid value, an unassigned ONU indicator or an ONU indicator indicating an ONU that is different from the ONUs assigned to the subset addressed by the group of EM frame(s) preceding the specific frame, the ONU does not need to determine whether the port-ID in the EM header correspond to one of the subset-IDs of the subset to which it is assigned, as described in FIG. 5. It is even not necessary to assign any subset ID.

Alternatively, instead of communicating the beginning location to the ONUs, one specific frame is located directly after the Framing Sublayer header in a Framing Sublayer frame comprising the Framing Sublayer payload. Namely, the first EM frame in the FS frame may be the specific frame.

The advantage of the approach is that there is no need to communicate upfront the beginning location of each subset of ONU in the frame. In this embodiment, the length indicator is determined in relation to the length of a single ONU group segment. All ONUs read the first specific frame. After that, different subsets may read different headers.

One of the original use cases of ONU grouping was energy efficiency. Here, multiple ONU groups are created, and ONUs in a group are allowed to power down some functions while transmission to other groups is ongoing. For example, an ONU assigned to Group 2 will be able to 'sleep' during the payload intended for Group 1 ONUs. Energy savings can especially be achieved by avoiding LDPC decoding. Hence, for this use case, it is preferable that one or more full codewords is contained for example in the section marked with vertical stripes in FIG. 3. A skilled person should understand that it also applies to the example described with respect to FIG. 6. It is advantageous that one or more full FEC CWs are comprised respectively in the dotted marked section and/or the sections marked with diagonal stripes. Thereby the ONU not assigned to the subset addressed by the group of frames may avoid decoding the full codewords not intended for it. The method is transparent to legacy G.hsp.comTC compliant ONUs.

Another use case of ONU grouping is to differentiate coding and/or modulation based on channel characteristics or ONU capabilities. Using flexible FEC, various code rates are defined that allow ONUs to achieve higher throughput (high code rate) or cover a larger optical loss budget (lower code rate) for ONUs that support those code rates. Here, legacy G.hsp.comTC compliant ONUs are only able to decode codewords that use the regular LDPC code with rate 0.84 as defined in the first version of G.hsp.comTC. Here, codewords that fall entirely inside the section marked with vertical stripes in FIG. 3 can be encoded using the code rate assigned to the group, whereas codewords that only partly fall inside the section marked with vertical stripes are encoded using the regular code rate. The specific frame is positioned entirely inside a regularly encoded codeword, allowing the legacy ONU to know the start of the next EM frame, even if some intermediate codewords are corrupt. Likewise, the EM header of the first EM frame after the section marked with vertical stripes in FIG. 3 is in a codeword that is regularly encoded.

The codewords may be all of equal length, or alternatively, an integer number N of regular codewords are replaced by an integer number M of alternative codewords. For instance, in case the length of the alternative code is ⅔ of the length of the regular code, then N=2 regular codewords may be replaced with M=3 alternative codewords.

The use case of flexible modulation is similar to that of flexible FEC, but instead of using a different FEC code rate, a different modulation format may be used. 100 Gbps PAM4 is a 50 Gbaud modulation format, and hence a legacy G.hsp.comTC compliant ONU may maintain its clock and data recovery, including equalization, functioning while receiving PAM4 symbols. When bit-interleaving across a block of D codewords is applied, it is preferential that all D CWs in the block use the same modulation format to avoid error propagation in DFE-like equalizers that may be applied in legacy G.hsp.comTC ONUs. It will further ease ONU implementation if the ONU group payload boundaries map onto PAM-4 codeword boundaries, i.e. the section marked with vertical stripes in FIG. 3 corresponds to the section marked with diagonal stripes in FIG. 3. The specific header has to fall inside the NRZ portion, so that NRZ ONUs are able to maintain the linked list. Consequently, the specific frame is at the end (or near the end) of the NRZ section, as depicted equivalently in FIG. 6.

When applying ONU grouping without flexible FEC or flexible modulation (i.e., in a conventional PON system), there are also several benefits:

Decoupling the ONU grouping from the FEC codewords: with the framing according to various embodiments, information about which data corresponds to which group is fully contained within the specific frames, and how they are placed. This allows decoupling the ONU grouping from the FEC codewords. In other words, switching between different groups is not limited to happen at the edges of FEC codewords, but could happen anywhere. This solves one of the problems of EP20151843.8, in which the necessary alignment between EM packets and FEC codewords of different groups caused a coupling between the service adaption sublayer (in which the EM frames are generated) and the Physical adaptation sublayer (in which the FEC codewords are generated) of the protocol, which complicates the processing.

Higher flexibility: in EP20151843.8, FEC codewords were assigned to groups in a pattern that was communicated up front. With the present disclosure, there is no obligation to have a static pattern. The OLT can choose to switch between groups as it desires when constructing the frame. This can be governed by the specific frame (which indicate the switching between groups), and which can be included as the frame is constructed. Note that this has the additional advantage that no map has to be communicated. This flexibility is also illustrated in FIG. 6.

In case of flexible FEC/modulation, the OLT may still communicate to the ONUs up front which part of the frame uses which FEC/modulation. In this case it is advantageous to still use the alignment of ONU groups with the FEC codewords as in the EP20151843.8 and to communicate the assignment up front.

Various embodiments may be applied to time-division multiplexing, TDM, PON technologies, such as gigabit PON, G-PON, ethernet PON, E-PON, 10 gigabit symmetrical PON, XGS-PON, and higher speed PONs. Furthermore, the proposed technique may be applied as well to time- and wavelength-division multiplexing, TWDM, PON technologies in which TDM systems at different wavelengths are stacked on the same PON system. One or more wavelengths in the TWDM PON system then operate as per the present disclosure.

Figure 7:
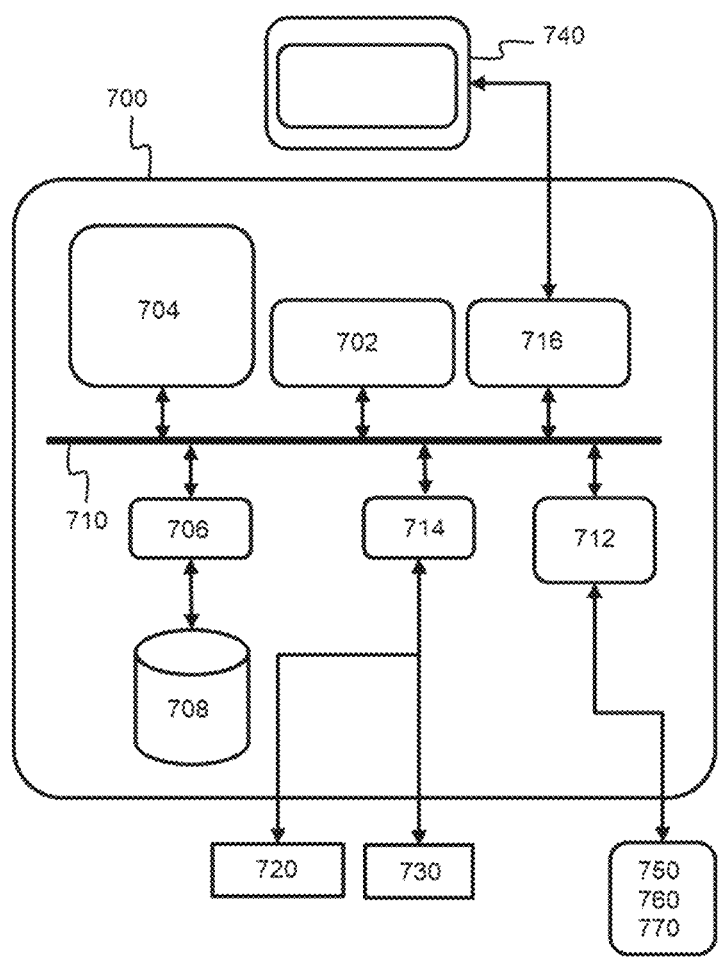
FIG. 7 shows an example embodiment of a suitable computing system for performing one or several steps in various embodiments.

FIG. 7 shows a computing system 700 comprising at least one processor; and at least one memory including computer program code, the at least one memory and computer program code configured to, with the at least one processor, cause the performance of the apparatus. The computing system 700 may in general be formed as a suitable general-purpose computer and comprise a bus 710, a processor 702, a local memory 704, one or more optional input interfaces 714, one or more optional output interfaces 716, a communication interface 712, a storage element interface 706, and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory, RAM, or another type of dynamic storage device that stores information and instructions for execution by processor 702 and/or a read only memory, ROM, or another type of static storage device that stores static information and instructions for use by processor 702. Input interface 714 may comprise one or more conventional mechanisms that permit an operator or user to input information to the computing device 700, such as a keyboard 720, a mouse 730, a pen, voice recognition and/or biometric mechanisms, a camera, etc. Output interface 716 may comprise one or more conventional mechanisms that output information to the operator or user, such as a display 740, etc. Communication interface 712 may comprise any transceiver-like mechanism such as for example one or more Ethernet interfaces that enables computing system 700 to communicate with other devices and/or systems, for example with other computing devices 750, 760, 770. The communication interface 712 of computing system 700 may be connected to such another computing system by means of a local area network, LAN, or a wide area network, WAN, such as for example the internet. Storage element interface 706 may comprise a storage interface such as for example a Serial Advanced Technology Attachment, SATA, interface or a Small Computer System Interface, SCSI, for connecting bus 710 to one or more storage elements 708, such as one or more local disks, for example SATA disk drives, and control the reading and writing of data to and/or from these storage elements 708. Although the storage element(s) 708 above is/are described as a local disk, in general any other suitable computer-readable media such as a removable magnetic disk, optical storage media such as a CD or DVD, -ROM disk, solid state drives, flash memory cards, . . . could be used. The computing system 700 may be materialized as, or may comprise, an Application Specific Integrated Circuit (ASIC), an Application Specific Instruction set Processor (ASIP), a Field Programmable Gate Array (FPGA), a Digital Signal Processor (DSP) based system or a combination thereof.

Such a computing system 700 is suitable for performing various steps performed by an OLT in an optical network according to various embodiments of the present disclosure. According to the present disclosure, the communication interface 712 allows an OLT according to various embodiments of the present disclosure to exchange control information and data with the ONUs in the PON. According to the example embodiments, the processor may be running a computer program code which allows the OLT to control the construction of the frames. More specifically, the program code performs the steps of: grouping data units for the optical network units into groups of Encapsulation Method, EM, frame(s), wherein a respective group of EM frame(s) comprises data units addressed to a respective subset of ONUs, generating, based on the groups of EM frame(s), a Framing Sublayer payload comprising at least one specific frame, wherein, the specific frame comprises a length indicator determined in relation to the length of the group(s) of EM frame(s) that is(are) directly following the specific frame and is(are) addressed to at least one subset of ONUs; instructing the ONUs assigned to at least one of said at least one subset to process the EM frame directly following the specific frame, and instructing the ONUs not assigned to the at least one subset to process the EM frame that is indicated by the length indicator of the specific frame; transmitting the Framing Sublayer payload to the ONUs.

Furthermore, the computing system 700 is also suitable for performing various steps performed by an ONU in an optical network according to various embodiments of the present disclosure. According to the present disclosure, the communication interface 712 allows an ONU according various embodiments of the present disclosure to receive control information and exchange data with an OLT in the PON. According to the example embodiments, the processor may be running a computer program code which allows the ONU to control the decoding of the received frame. More specifically, the program code performs the steps of: receiving a Framing Sublayer payload from the OLT; obtaining a specific frame comprised in the Framing Sublayer payload, wherein, the specific frame comprises a length indicator related to the length of group(s) of EM frame(s) directly following the specific frame that is(are) addressed to at least one subset of ONUs; determining, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

Figure 8:
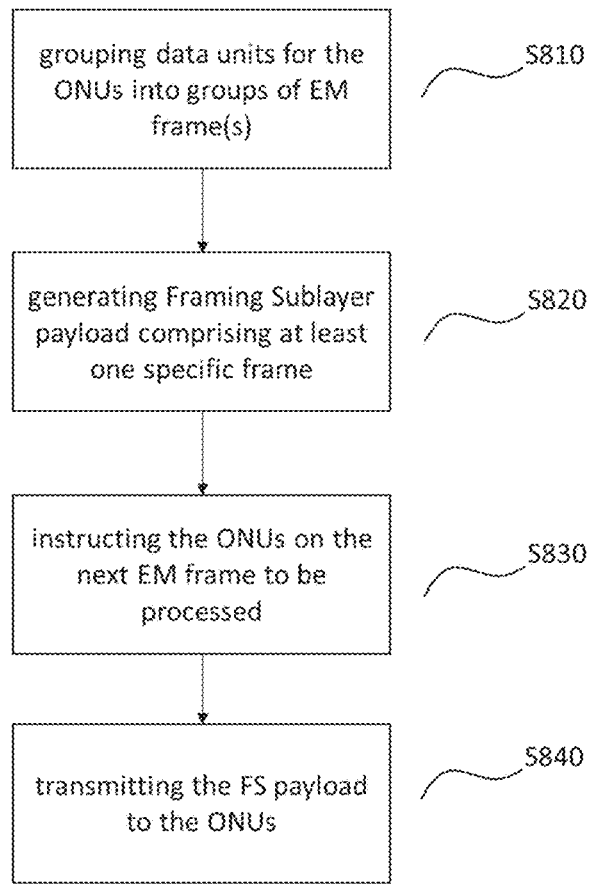
FIG. 8 shows an example method 800 incorporating aspects of the example embodiments.

FIG. 8 shows an example method 800 incorporating aspects of the example embodiments.

In step S810, an OLT implementing aspects of the example embodiments groups data units for the ONUs into groups of EM frame(s), wherein a respective group of EM frame(s) comprises data units addressed to a respective subset of ONUs.

In step S820, the OLT generates, based on the groups of EM frame(s), a FS payload comprising at least one specific frame, wherein, the specific frame comprises a length indicator determined in relation to the length of the group(s) of EM frame(s) that is(are) directly following the specific frame and is(are) addressed to at least one subset of ONUs.

In step S830, the OLT instructs the ONUs assigned to at least one of said at least one subset to process the EM frame directly following the specific frame, and instructing the ONUs not assigned to the at least one subset to process the EM frame that is indicated by the length indicator of the specific frame.

In step S840, the OLT transmits the FS payload to the ONUs.

Figure 9:
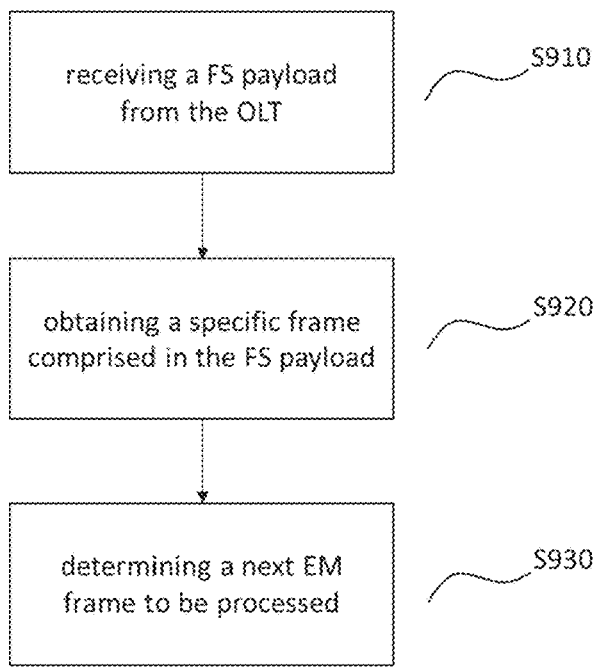
FIG. 9 shows another example method 900 incorporating aspects of the example embodiments.

FIG. 9 shows another example method 900 incorporating aspects of the example embodiments.

In step S910, an ONU implementing aspects of the example embodiments receives a FS payload from the OLT.

In step S920, the ONU obtains a specific frame comprised in the FS payload, wherein, the specific frame comprises a length indicator related to the length of group(s) of EM frame(s) directly following the specific frame that is(are) addressed to at least one subset of ONUs.

In step S930, the ONU determines, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus, for use by an Optical Line Terminal, OLT, communicatively connected to optical network units, ONUs, comprising:
   at least one memory including instructions; and
   at least one processor configured to execute the instructions and cause the apparatus to perform,
   grouping data units for the optical network units into groups of Encapsulation Method, EM, frame(s), wherein a respective group of EM frame(s) comprises data units addressed to a respective subset of ONUs,
   generating, based on the groups of EM frame(s), a Framing Sublayer payload comprising at least one specific frame, wherein, the specific frame comprises a length indicator determined in relation to the length of the group (s) of EM frame(s) that is(are) directly following the specific frame and is(are) addressed to at least one subset of ONUs,
   instructing the ONUs assigned to at least one of said at least one subset to process the EM frame directly following the specific frame, and instructing the ONUs not assigned to the at least one subset to process the EM frame that is indicated by the length indicator of the specific frame, and
   transmitting the Framing Sublayer payload to the ONUs.

2. The apparatus according to claim 1, wherein, the specific frame is a special EM frame comprising an EM header and zero payload.

3. The apparatus according to claim 2, wherein the length indicator is comprised in a Payload Length Indicator field of the EM header of the special EM frame.

4. The apparatus according to claim 2, wherein, the specific frame further comprises respondent information for instructing the ONUs assigned to at least one of said at least one subset to process the EM frame directly following the specific frame, or the ONUs not assigned to the at least one subset to process the EM frame that is indicated by the length indicator of the specific frame.

5. The apparatus according to claim 4, wherein the respondent information is comprised in a port-ID field or in an options field of the EM header of the special EM frame.

6. The apparatus according to claim 1, wherein, the specific frame comprises a subset indicator indicating a subset, and the length indicator is determined in relation to the length of the group of EM frame(s) that is directly following the specific frame and is addressed to the subset of ONUs indicated in the subset indicator, or in relation to the length of the group(s) of EM frame(s) that is(are) directly following the specific frame and is(are) not addressed to the subset of ONUs indicated in the subset indicator.

7. The apparatus according to claim 1, wherein the specific frame comprises at least one of: an ONU indicator with an invalid value, an unassigned ONU indicator or an ONU indicator indicating an ONU that is different from the ONUs assigned to the subset addressed by the group of EM frame(s) preceding the specific frame, and wherein the length indicator is determined in relation to the length of the group(s) of EM frame(s) directly following the specific frame that is(are) not addressed to the subset of ONUs addressed by the group of EM frame(s) preceding the specific frame.

8. The apparatus according to claim 1, wherein the apparatus is further caused to perform,
communicating, to respective ONUs, an indication of a beginning location of the group of EM frame(s) corresponding to the subset to which it is assigned.

9. The apparatus according to claim 1, wherein at least one group of EM frame(s) is transmitted using a predetermined modulation format and/or encoded with a predetermined FEC code and at least one other group of EM frame(s) is transmitted using a different modulation format and/or encoded with a different FEC code.

10. The apparatus according to claim 1, wherein the apparatus is further caused to perform, communicating, to respective ONUs, a subset identification of the subset to which it is assigned.

11. An apparatus, for use by an Optical Network Unit, ONU, communicatively connected to an Optical Line Terminal, OLT, comprising:
at least one memory including instructions; and
at least one processor configured to execute the instructions and cause the apparatus to perform,
receiving a Framing Sublayer payload from the OLT;
obtaining a specific frame comprised in the Framing Sublayer payload, wherein, the specific frame comprises a length indicator related to the length of group (s) of EM frame(s) directly following the specific frame that is(are) addressed to at least one subset of ONUs; and
determining, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

12. The apparatus according to claim 11, wherein the apparatus is further caused to perform
determining the next EM frame to be processed based on a special configuration regarding ONU grouping, wherein the special configuration regarding ONU grouping comprises at least one of: a subset Identification of the subset to which a respective ONU is assigned or an indication of a beginning location of the group of EM frame(s) corresponding to the subset to which it is assigned.

13. The apparatus according to claim 12, wherein the apparatus is further caused to perform,
receiving the special configuration regarding ONU grouping from the OLT.

14. A method, for use by an Optical Line Terminal, OLT, communicatively connected to optical network units, ONUs, comprising:
grouping data units for the optical network units into groups of Encapsulation Method, EM, frame(s), wherein a respective group of EM frame(s) comprises data units addressed to a respective subset of ONUs;
generating, based on the groups of EM frame(s), a Framing Sublayer payload comprising at least one specific frame, wherein, the specific frame comprises a length indicator determined in relation to the length of the group(s) of EM frame(s) that is(are) directly following the specific frame and is(are) addressed to at least one subset of ONUs;
instructing the ONUs assigned to at least one of said at least one subset to process the EM frame directly following the specific frame, and instructing the ONUs not assigned to the at least one subset to process the EM frame that is indicated by the length indicator of the specific frame; and
transmitting the Framing Sublayer payload to the ONUs.

15. A method, for use by an Optical Network Unit, ONU, communicatively connected to an Optical Line Terminal, OLT, comprising:
receiving a Framing Sublayer payload from the OLT;
obtaining a specific frame comprised in the Framing Sublayer payload, wherein, the specific frame comprises a length indicator related to the length of group (s) of EM frame(s) directly following the specific frame that is(are) addressed to at least one subset of ONUs; and
determining, as instructed by the OLT, a next EM frame to be processed as the EM frame directly following the specific frame, if the ONU is assigned to said at least one subset, or determining a next EM frame to be processed as the EM frame that is indicated by the length indicator of the specific frame, if the ONU is not assigned to the at least one subset.

* * * * *